US006705938B2

(12) United States Patent
Everhart et al.

(10) Patent No.: US 6,705,938 B2
(45) Date of Patent: Mar. 16, 2004

(54) APPARATUS FOR CONTROLLING THE ENVIRONMENT OF A PARKED VEHICLE

(75) Inventors: David Everhart, Knoxville, TN (US); Lloyd G. B. Cooper, Birmingham, AL (US)

(73) Assignee: IdleAire Technologies Corporation, Knoxville, TN (US)

( * ) Notice: Subject to any disclaimer, the term of this patent is extended or adjusted under 35 U.S.C. 154(b) by 0 days.

(21) Appl. No.: 10/241,208

(22) Filed: Sep. 11, 2002

(65) Prior Publication Data

US 2003/0199242 A1 Oct. 23, 2003

Related U.S. Application Data

(60) Provisional application No. 60/375,038, filed on Apr. 22, 2002.

(51) Int. Cl.[7] ................................................ B60H 1/22
(52) U.S. Cl. ....................................... 454/119; 165/202
(58) Field of Search ................................ 454/119, 133; 165/202

(56) References Cited

U.S. PATENT DOCUMENTS

| | | |
|---|---|---|
| 2,612,830 A | 10/1952 | Kendrick |
| 2,646,496 A | 7/1953 | Takach ........................ 219/39 |
| 2,683,407 A | 7/1954 | Takach |
| 2,746,372 A | 5/1956 | Smith et al. |
| 2,962,951 A | 12/1960 | Holmes |
| 3,211,076 A | 10/1965 | Chancellor et al. |
| 3,360,954 A | 1/1968 | Snider et al. ................. 62/259 |
| 3,777,506 A | 12/1973 | Hergatt et al. ................ 62/237 |
| 3,878,886 A | 4/1975 | McIntire, Jr. ................. 165/29 |
| 4,632,019 A | 12/1986 | Whiteman |
| 5,104,037 A | 4/1992 | Karg et al. ................... 236/46 |
| 5,279,458 A | 1/1994 | DeWolf et al. ................ 236/47 |
| 5,386,461 A | 1/1995 | Gedney ...................... 379/102 |
| 5,661,984 A | 9/1997 | Durrell et al. ................ 62/304 |
| 5,687,573 A | 11/1997 | Shih ............................ 62/3.6 |
| 5,748,104 A | 5/1998 | Argyroudis et al. ... 340/870.11 |
| 5,816,443 A | 10/1998 | Bustos ........................ 221/211 |
| 5,859,779 A | 1/1999 | Giordano et al. ....... 364/479.01 |
| 5,926,531 A | 7/1999 | Petite ........................ 379/144 |
| 5,931,012 A | 8/1999 | Robertson .................... 62/237 |
| 6,147,601 A | 11/2000 | Sandelman et al. ......... 340/506 |
| 6,160,477 A | 12/2000 | Sandelman et al. ......... 340/506 |
| 6,181,991 B1 * | 1/2001 | Kondo et al. .................. 701/22 |
| 6,211,782 B1 | 4/2001 | Sandelman et al. ......... 340/506 |
| 6,241,156 B1 | 6/2001 | Kline et al. ................ 236/49.3 |
| 6,330,806 B1 | 12/2001 | Beaverson et al. ........... 62/201 |
| 2001/0031618 A1 * | 10/2001 | Wilson et al. ............... 454/119 |
| 2001/0048376 A1 * | 12/2001 | Maeda et al. ............. 340/70.17 |
| 2002/0029096 A1 * | 3/2002 | Takai et al. ................. 700/276 |

FOREIGN PATENT DOCUMENTS

| | | |
|---|---|---|
| DE | 37 11 116 | * 10/1988 |
| WO | WO 01/56821 | 8/2001 |

OTHER PUBLICATIONS

"Quickstart Guide PNV," *Connect!*, Dec. 2000, www.PNV-.com, p. 71.

News, *Park 'N View Completes its 125th Truckstop Installation at TravelCenters of America*, Ontario, CA, Aug. 25, 1998, Business Wire (newswire).

News, *Park 'N View, Inc. Secures Financing for National Expansion*, Dec. 9, 1996, News Wire.

* cited by examiner

*Primary Examiner*—Harold Joyce
(74) *Attorney, Agent, or Firm*—Wood, Herron & Evans, L.L.C.

(57) ABSTRACT

An apparatus for controlling the inside of a parked vehicle particularly a parked truck includes a HVAC unit and electric switching apparatus supported in a parking area with cabling and hosing which connects to the parked vehicle via a head unit. The head unit includes a cover which opens to expose controls housed in said unit utilizing a central processor which in turn communicate for example via the Internet to a server providing for activation of the unit and payment for the services.

27 Claims, 14 Drawing Sheets

APPARATUS FOR CONTROLLING THE ENVIRONMENT OF A PARKED VEHICLE

RELATED APPLICATIONS

This application is related to Provisional Application No. 60/375,038 filed Apr. 22, 2002 entitled Apparatus for Controlling the Environment of a Parked Vehicle which is now pending.

BACKGROUND

Long haul truckers frequently spend the night in the cabs of their trucks. In fact, many trucks are designed with sleeping areas. This necessitates environmental control and specifically heating and cooling. In order to provide this heating or cooling, the truck drivers generally leave the trucks running overnight to utilize the truck's heating or air conditioning system. The cumulative pollution created by these vehicles running overnight is very significant.

Further, although such trucks are in a position to receive radio signals, they are frequently located in positions where television signals are unavailable or weak and certainly no telephone connections are available to the truck itself.

Providing these services to a parked truck involves overcoming many practical and physical problems. Payment for these services is a concern as well as physically fitting the equipment needed to provide these services in a small space is problematic. Protecting this equipment from the environment is also a concern.

SUMMARY OF THE INVENTION

Thus, it is an object of the present invention to provide an apparatus and method for controlling the inside environment of a vehicle such as a truck, RV or other vehicle. More particularly, it is an object of the present invention to not only provide heating and air conditioning but other conveniences such as electricity, phone hookups, computer hookups, videos such as for continuing education instruction or entertainment and a variety of related services, providing such services within a limited access space, i.e., through the window of a truck or a small access door. Further, additional services may be provided for the vehicle, including the ability to watch television, the ability to communicate and even the ability to pay for the services. These additional services may be delivered through wires or with a wireless system.

Further, the present invention protects the equipment from the environment.

The objects and advantages of the present invention will be further appreciated in light of the following detailed description and drawings in which:

DETAILED DESCRIPTION

Figure 1:
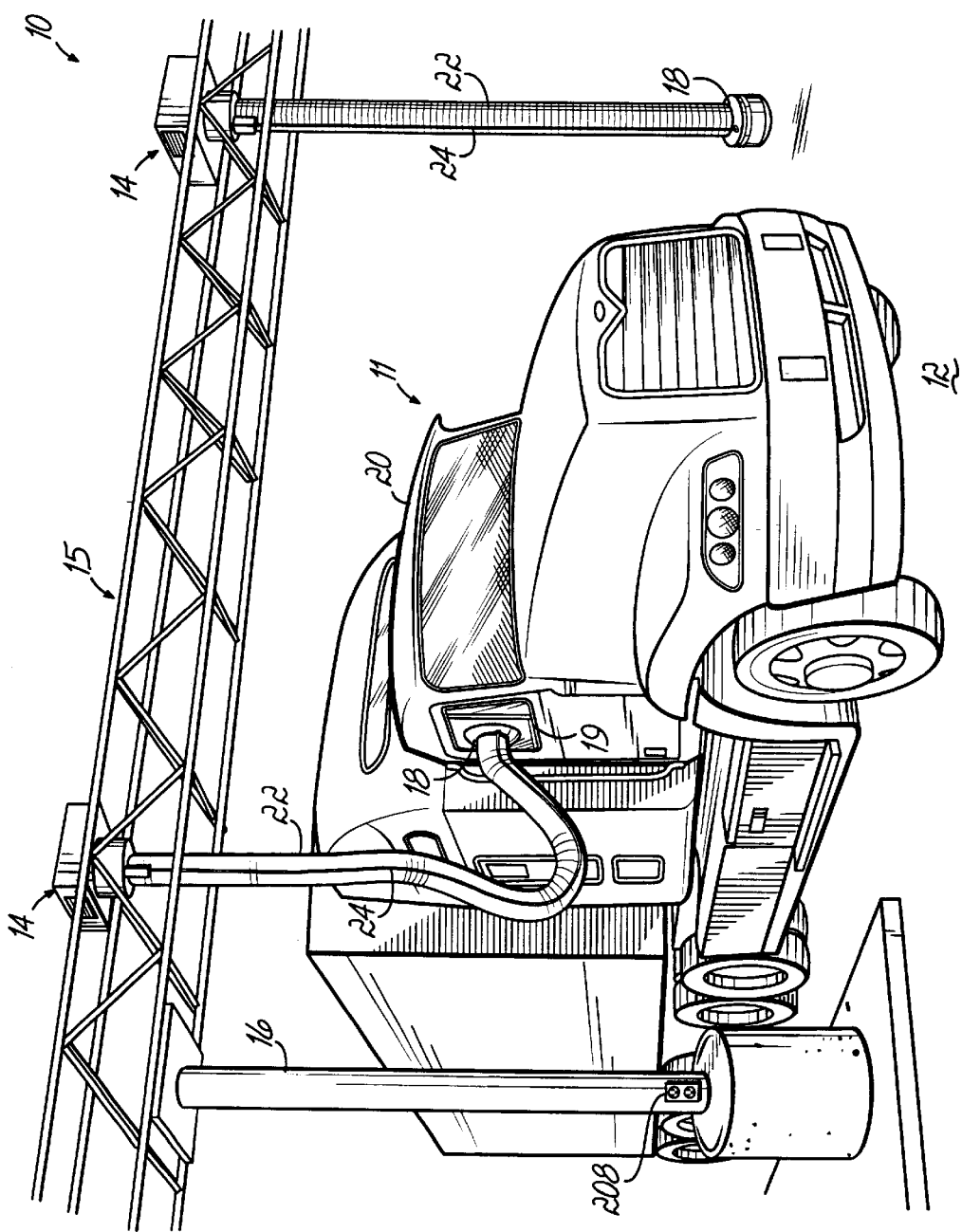
FIG. 1 is a perspective view of a truck with the apparatus of the present invention.

As shown in FIG. 1, the present invention is an apparatus 10 for controlling the internal environment of a vehicle such as a truck 11 shown in a parking space 12. It includes an environmental control (HVAC) unit 14 which is suspended above the ground on a support 15 resting on posts 16. The apparatus further includes a ventilation head 18 which as shown is attached to the passenger side window 19 of the cab of a truck 20 using a template. The head 18 is connected to the HVAC unit 14 by coaxial conduit 22 which runs from the head 18 to the HVAC unit 14 and by an electrical cable 24 which again runs from the support alongside the coaxial conduit 22 to the head and can be held in a sleeve connected to conduit 22. This is attached to a breakaway connector 21 near support 15.

Figure 9:
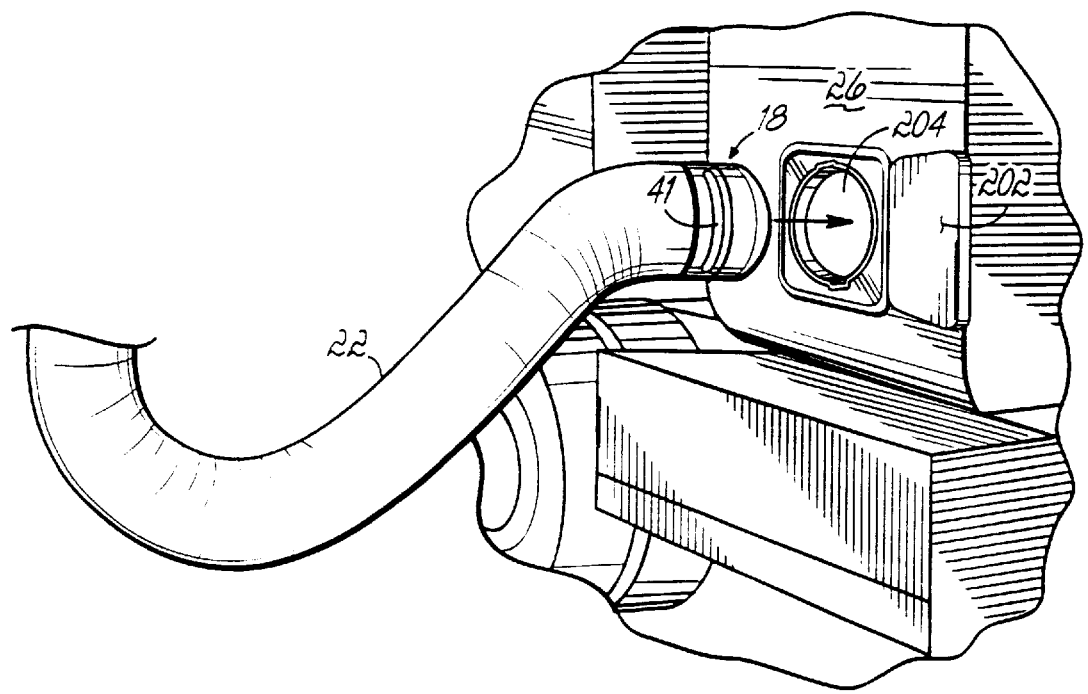
FIG. 9 is a perspective view showing one alternative form of the invention.
Figure 10:
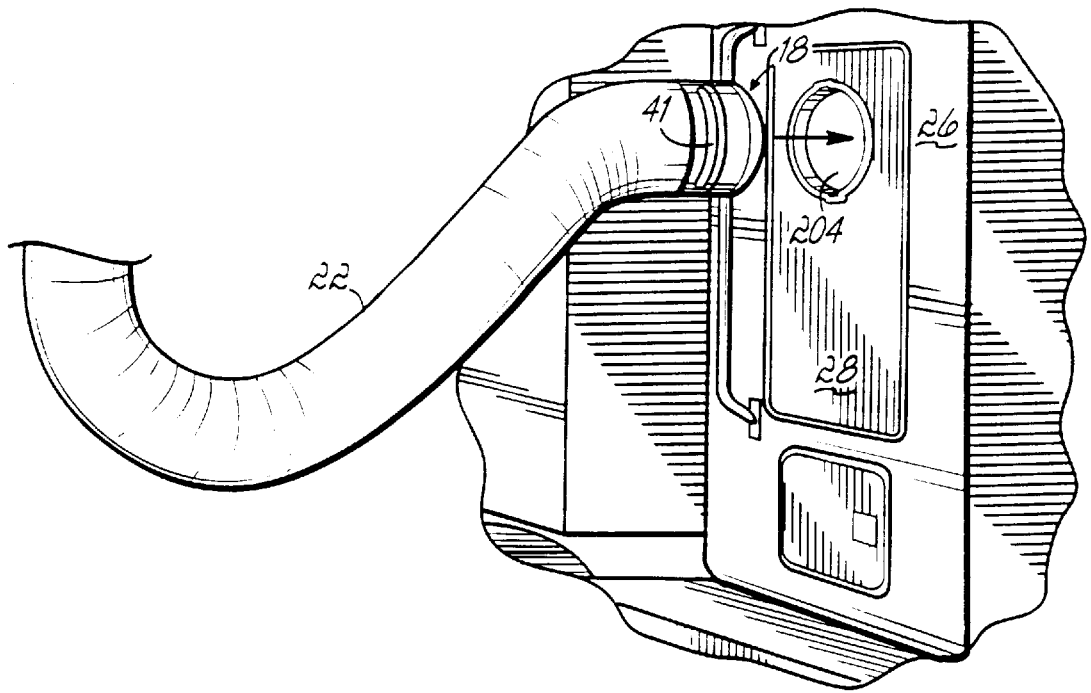
FIG. 10 is a perspective view of a second alternative form of the invention.

The head 18 as shown in FIG. 1 is attached to the window 19 of a truck cab 20. However, it can also be attached at any location to the truck provided there is a receptacle within the truck adapted to support the ventilation head. FIGS. 9 and 10 show embodiments in which the ventilation head 18 is attached to a side wall 26 of the truck cab at the door 28 of the sleeper compartment 30 as is disclosed in more detail below.

Figure 7:
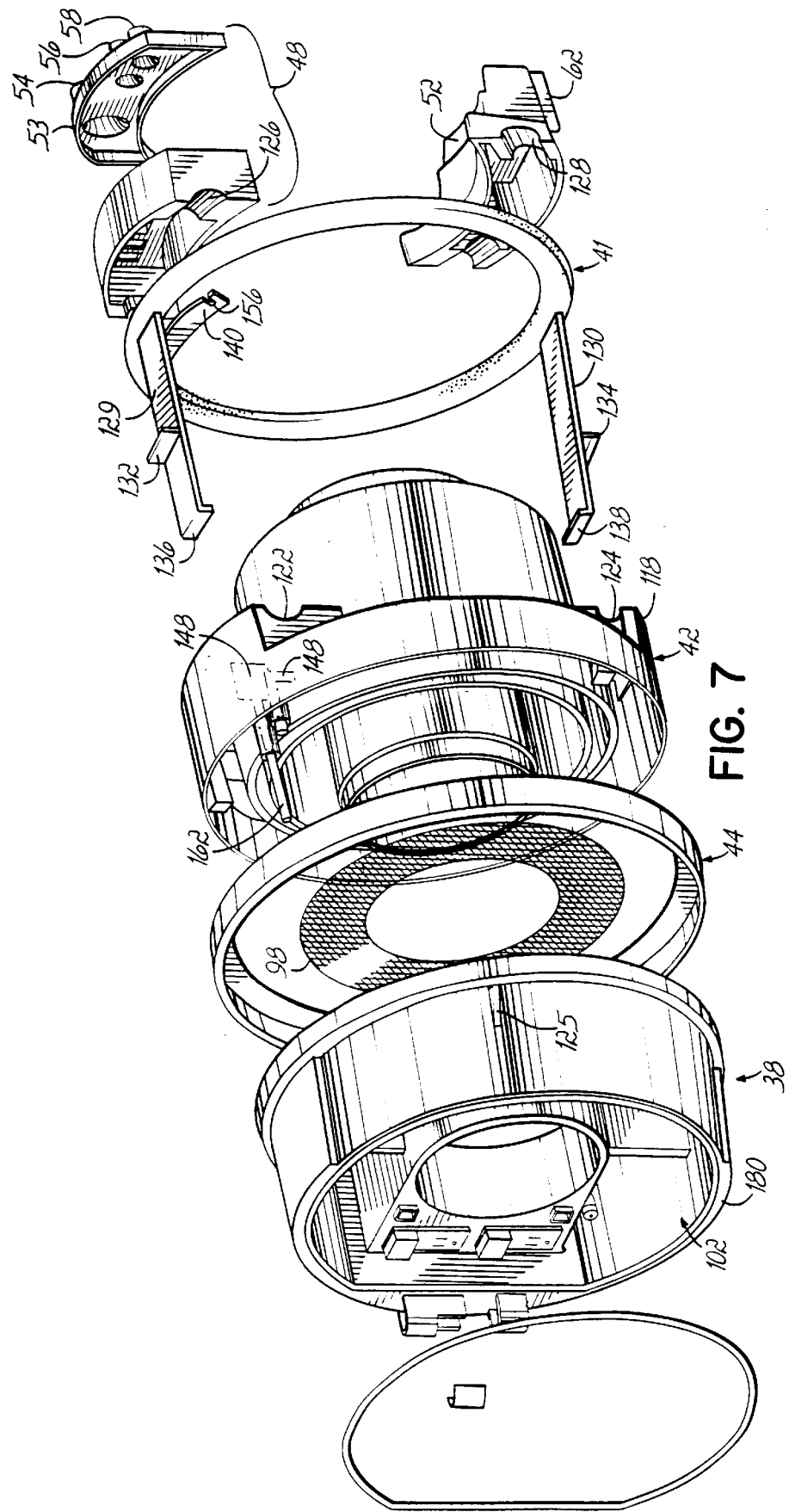
FIG. 7 is a disassemble perspective view of the apparatus of the present invention without the cover.
Figure 8:
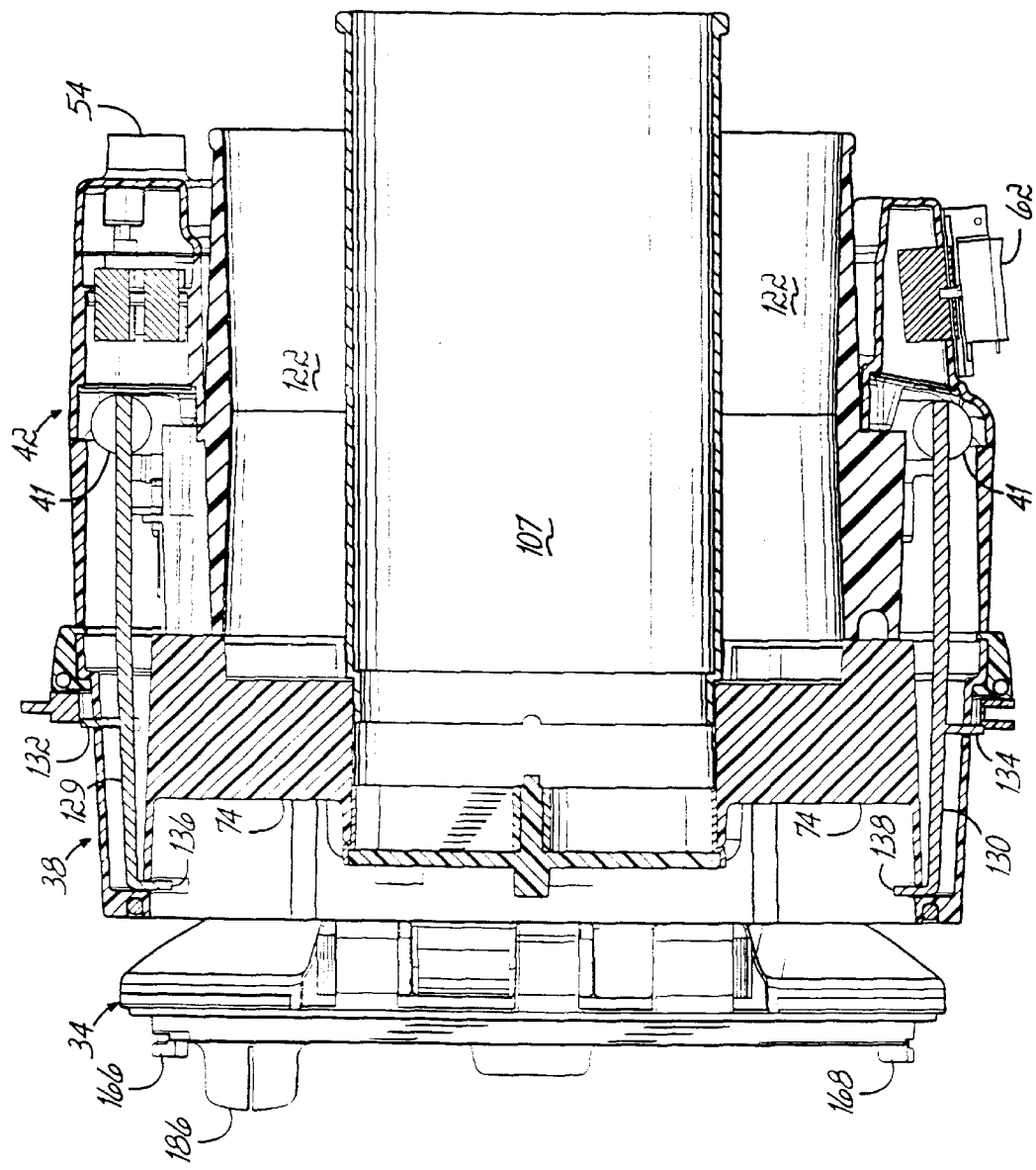
FIG. 8 is a cross-sectional view taken at lines 8—8 of FIG. 2.

Head 18 includes a body portion 32 and a cover 34 which closes and seals the face 36 of the body portion 32. These are attached by a hinge 31 which preferably can be adjusted to vary the tension. As shown in FIG. 7, the body portion 32 includes an inner housing portion 38 attached to an outer housing portion 42 with a gasket 44 between the two. Attached to the outer housing 42 is a circular handle 41 which is held onto the outer housing by first and second bracket members 48, 52. The first bracket member 48 includes one low voltage connection 54 and two high voltage connectors 56, 58 connectors. These are all preferably water tight connectors. The bracket 48 includes a removable service cover 53. The second bracket 52 includes an exterior GFI A/C outlet 62.

Figure 2:
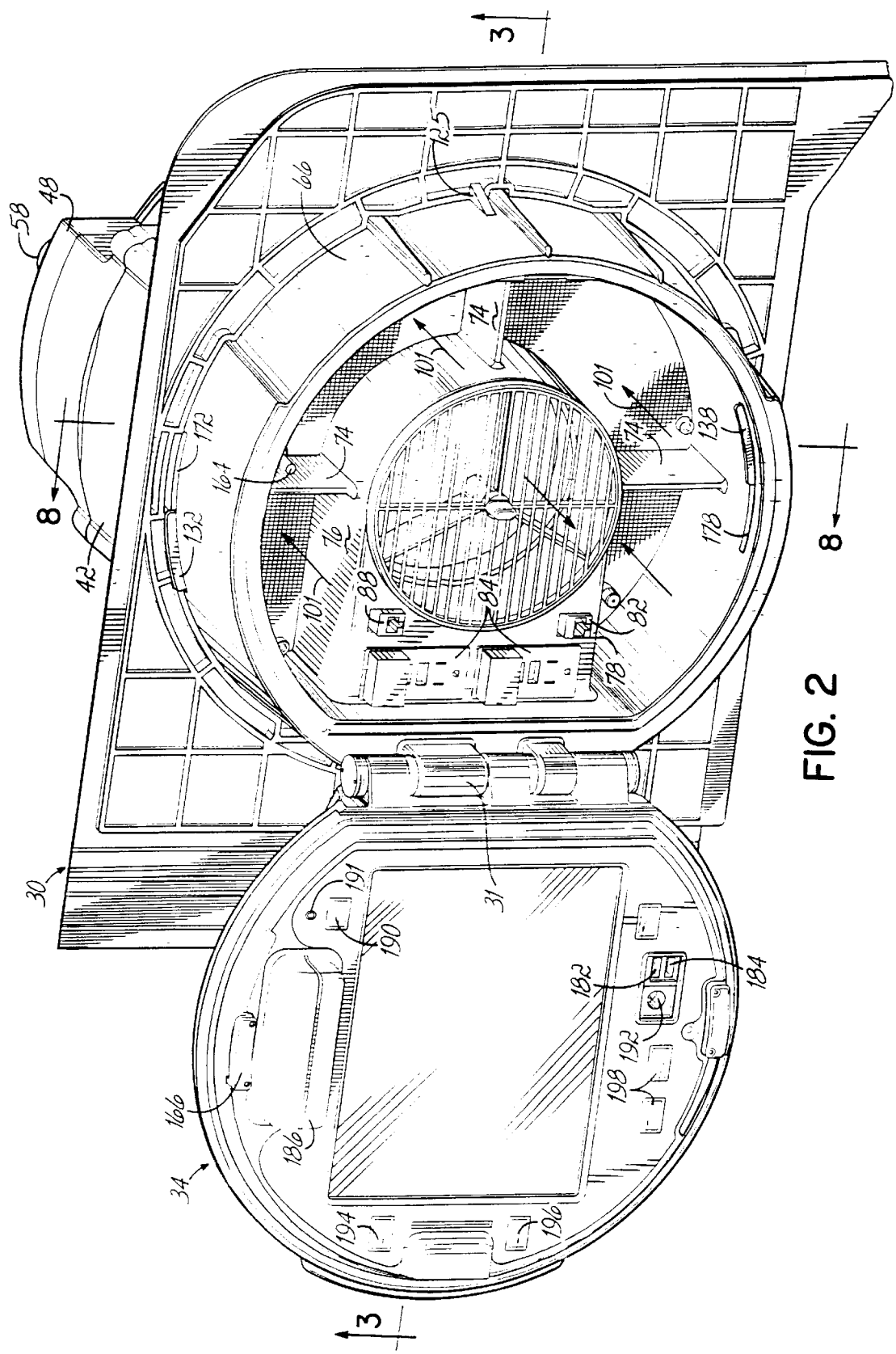
FIG. 2 is a perspective view of the apparatus of the present invention attached to a window adapter.
Figure 3:
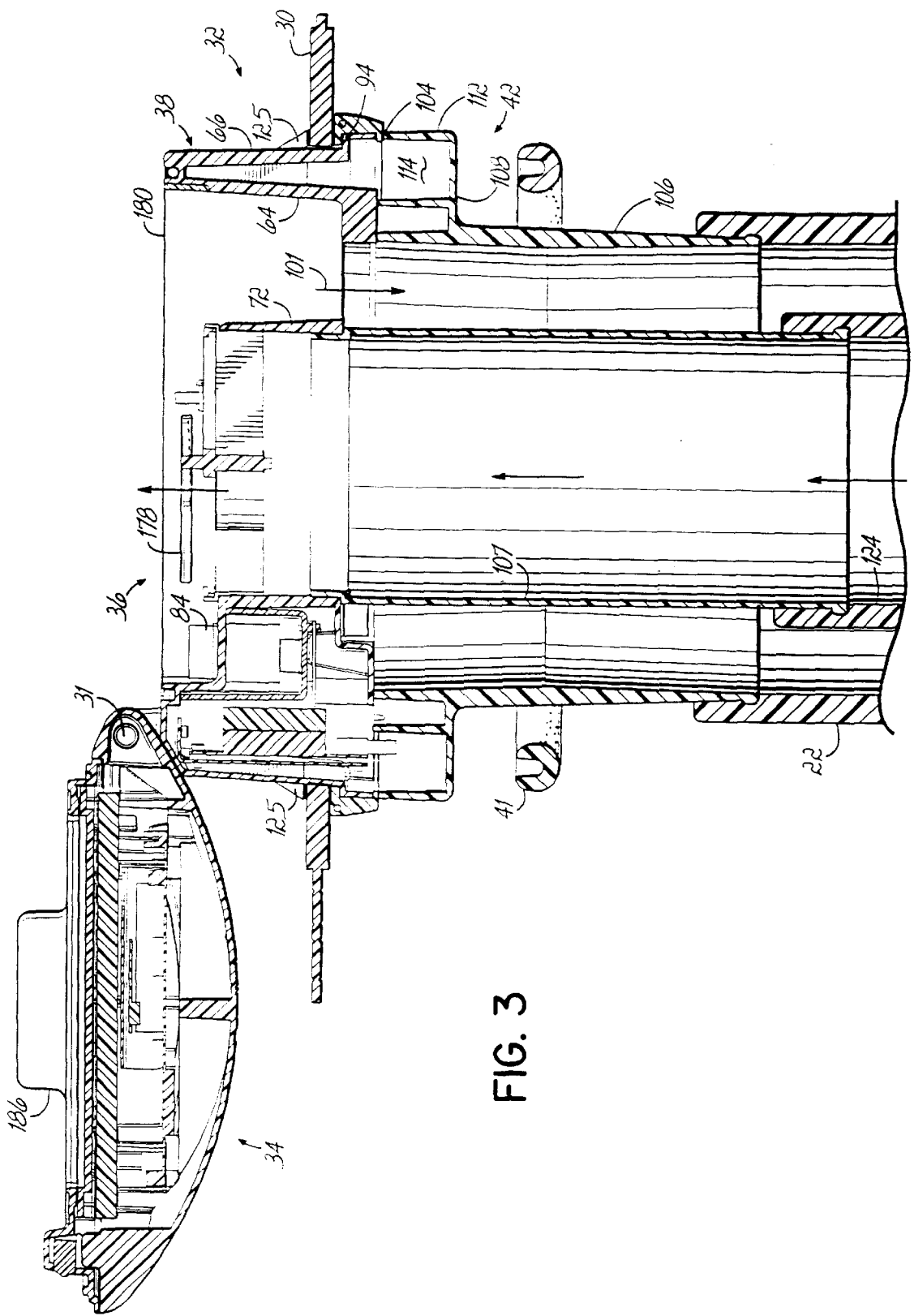
FIG. 3 is a cross-sectional view taken at lines 3—3 of FIG. 2.
Figure 4:
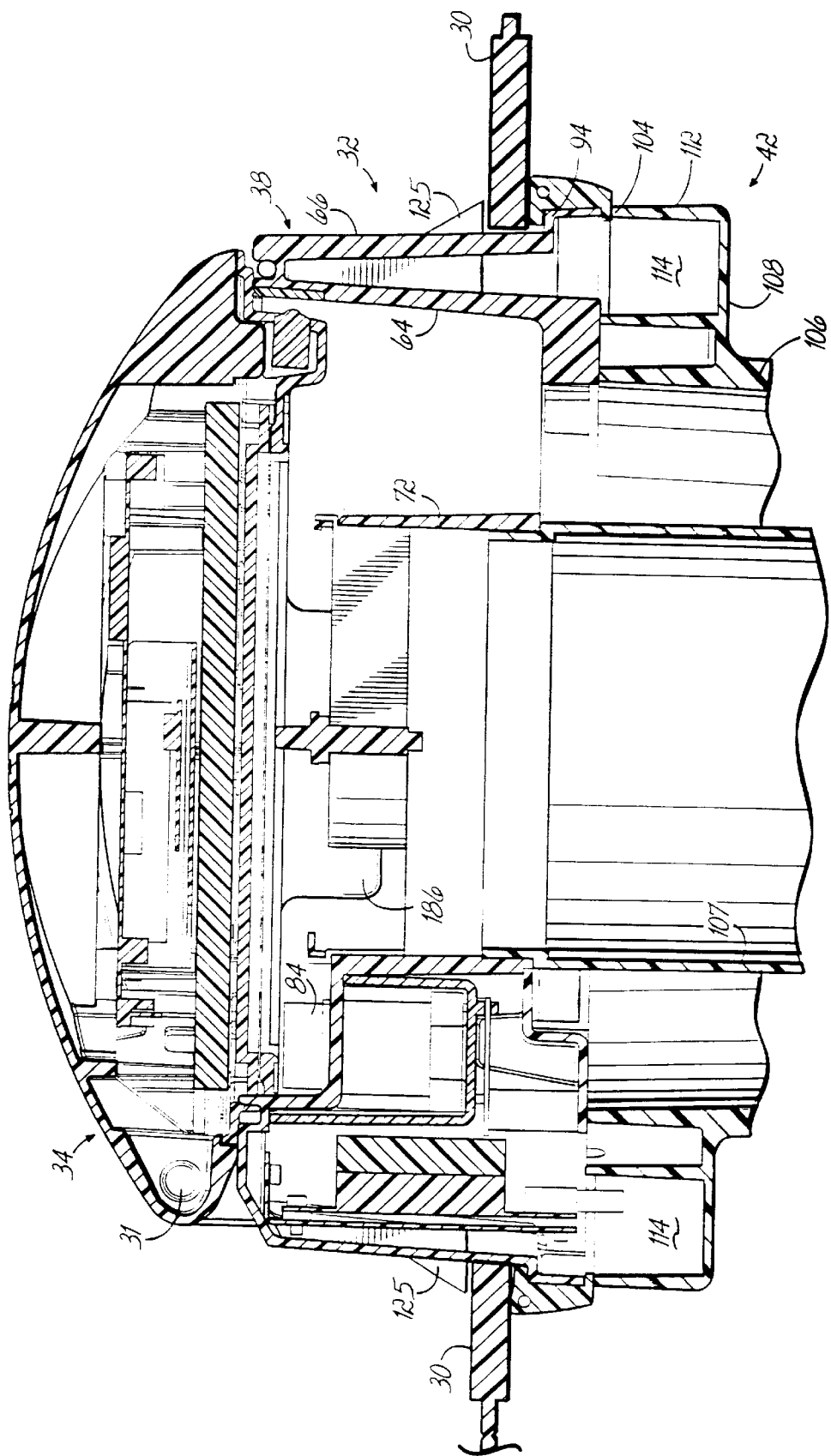
FIG. 4 is a cross-sectional view of the apparatus similar to FIG. 3 showing the cover of the device closed.
Figure 5:
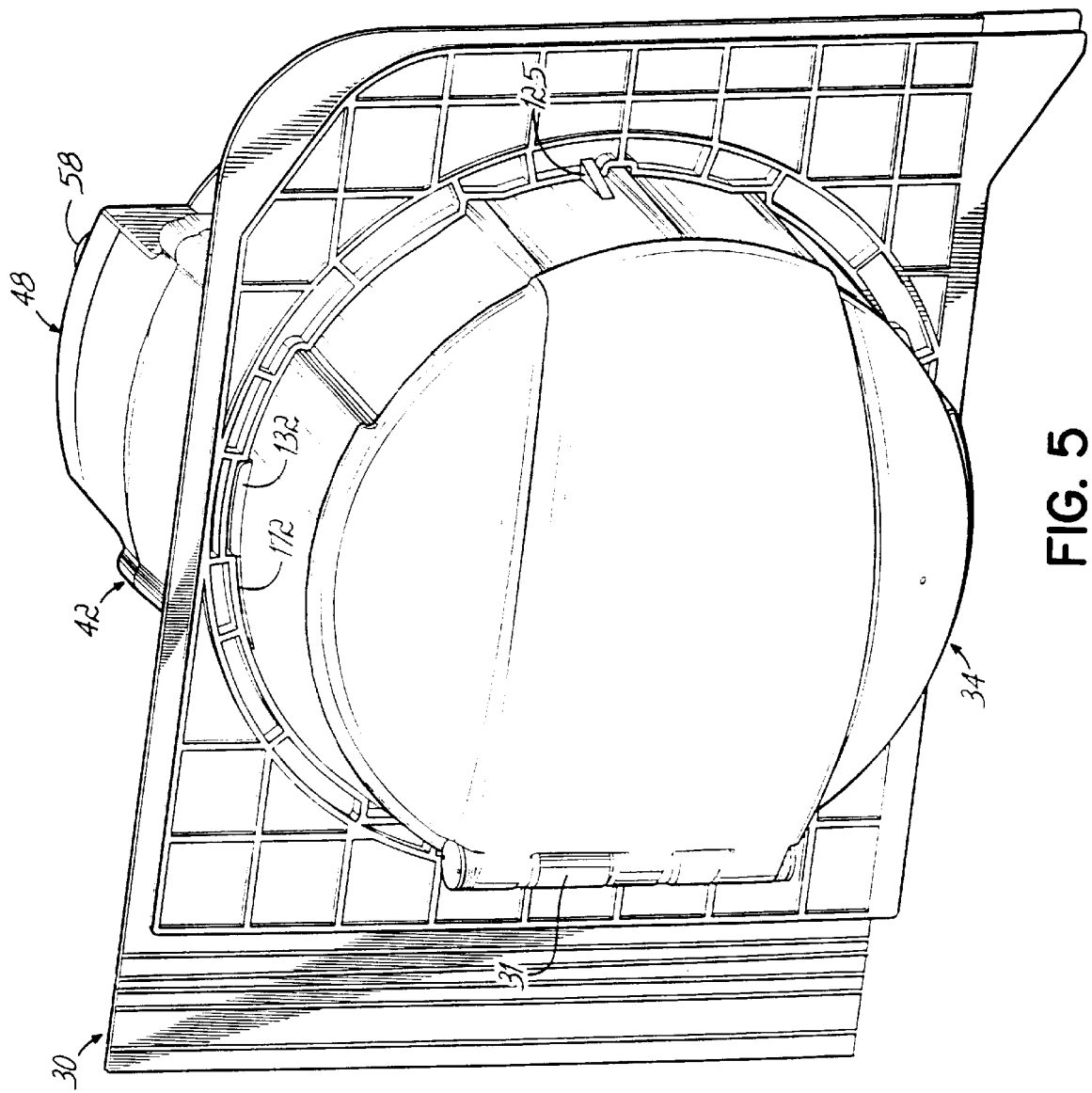
FIG. 5 is a perspective view of the apparatus of the present invention attached to a window adapter with the cover closed.
Figure 6:
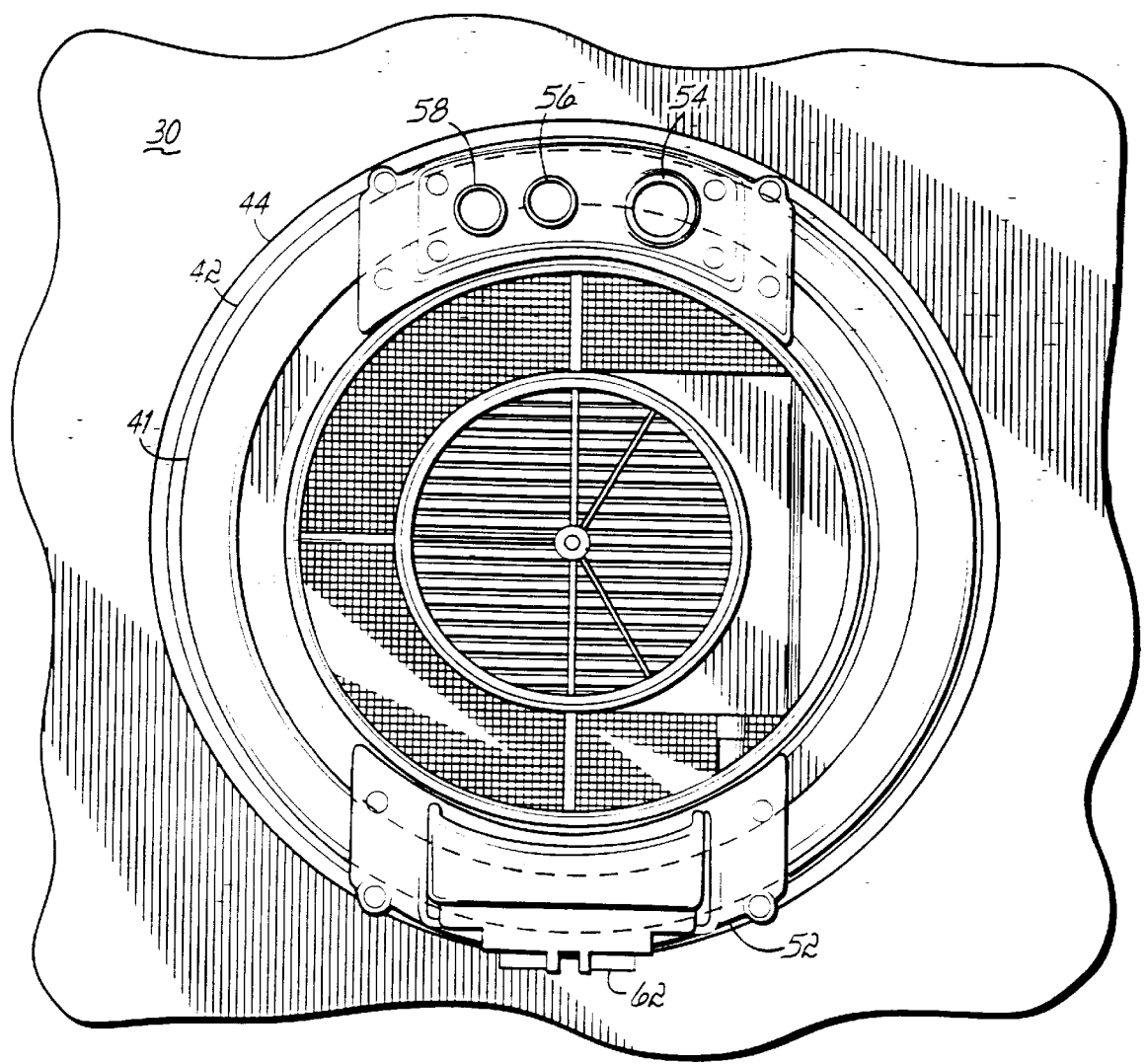
FIG. 6 is a rear view of the device of the present invention.

As shown in FIGS. 2 and 3, the inner housing 38 has an inner wall 64 and an outer wall 66 with an annular passageway 68 there between. An inner circular conduit 72 is supported by first, second and third support members 74 which extend to the inner wall 64 of the upper housing. Extended from this circular conduit 72 are upper and lower walls 76, 78 and face 82 which supports first and second A/C electrical outlets 84, 86. Fan 82 is a removable service cover. Also as shown on face 82 are a phone connector 88 and an ethernet connection 92.

Outer wall 66 has a lower stepped annular portion 94 which is covered by gasket 44. An annular screen 98 is positioned to cover the area 102 between the inner conduit 72 and the inner wall 64 of the inner housing. Area 102 is the return air flow passage for the system as indicated by arrow 101.

Abutting the gasket 44 is the upper edge 104 of the outer housing 42. The outer housing 32 includes circular wall 106 which forms a conduit. Inside the conduit 106 of the lower housing is a lesser diameter conduit 107 which attaches to the inner circular wall 72 of the upper housing.

Extended from the conduit 106 is an annular extension 108 which leads to the outermost or exterior wall portion 112 having edge 104. This provides an annular passage 114 which communicates with the inner passage 68 of the inner housing 38. The outer housing 42 further includes first and second handle receiving members 116, 118 which each include semi-circular arcuate channels 122, 124. The ring shaped handle 41 is held within this groove by brackets 48 and 52, each of which have handle recessive grooves 126, 128.

Extending up from the handle are first and second prongs 129, 130. Each prong includes an outwardly extended tab 132, 134 and an inwardly extended tab 136, 138. The first prong 129 further includes a planar arcuate member 140 perpendicular to and welded to the inside surface of the prong 129.

Figure 11A:
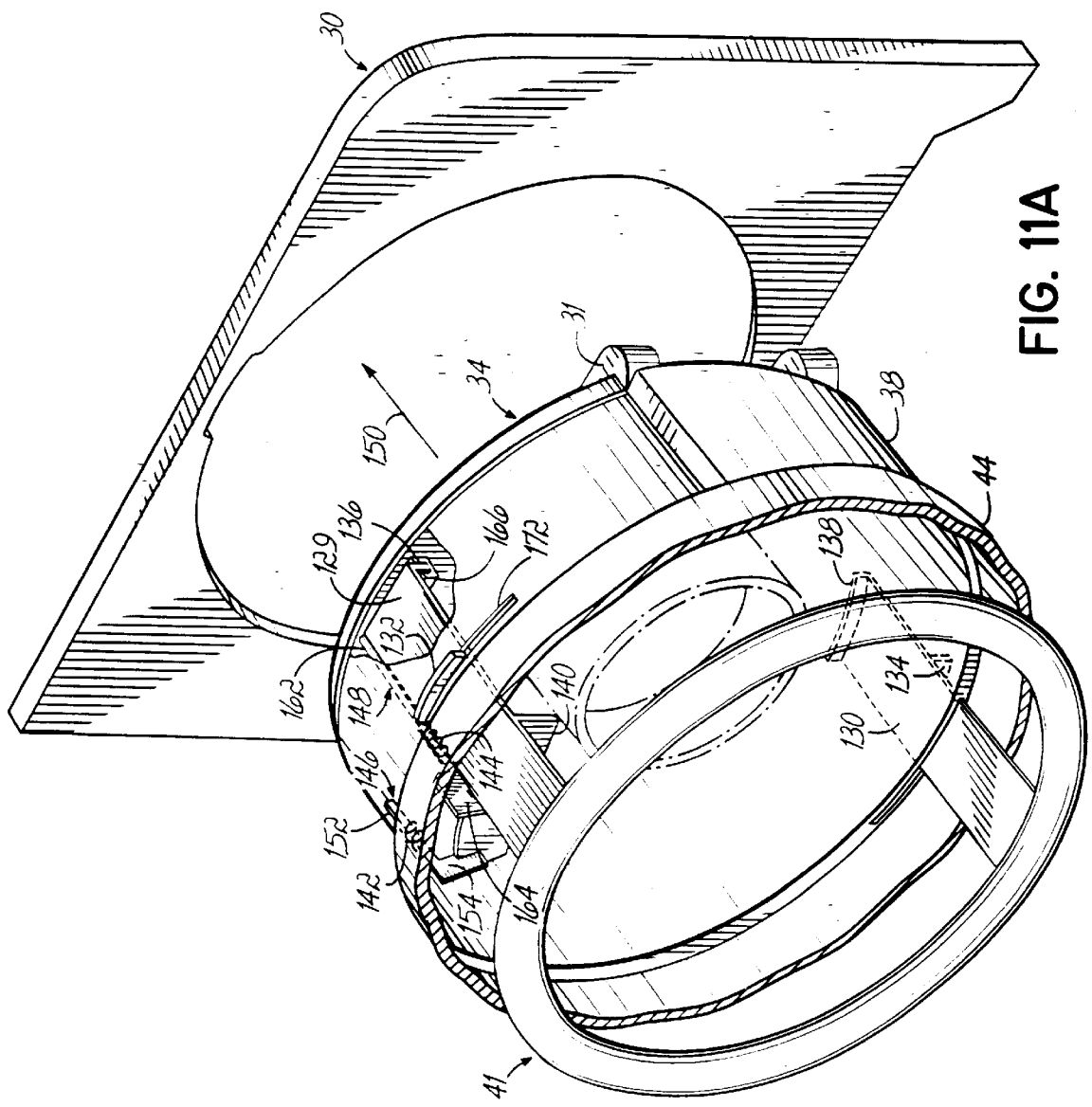
FIGS. 11A–11E is are a series of perspective views depicting the installation of the environmental control unit.
Figure 11B:
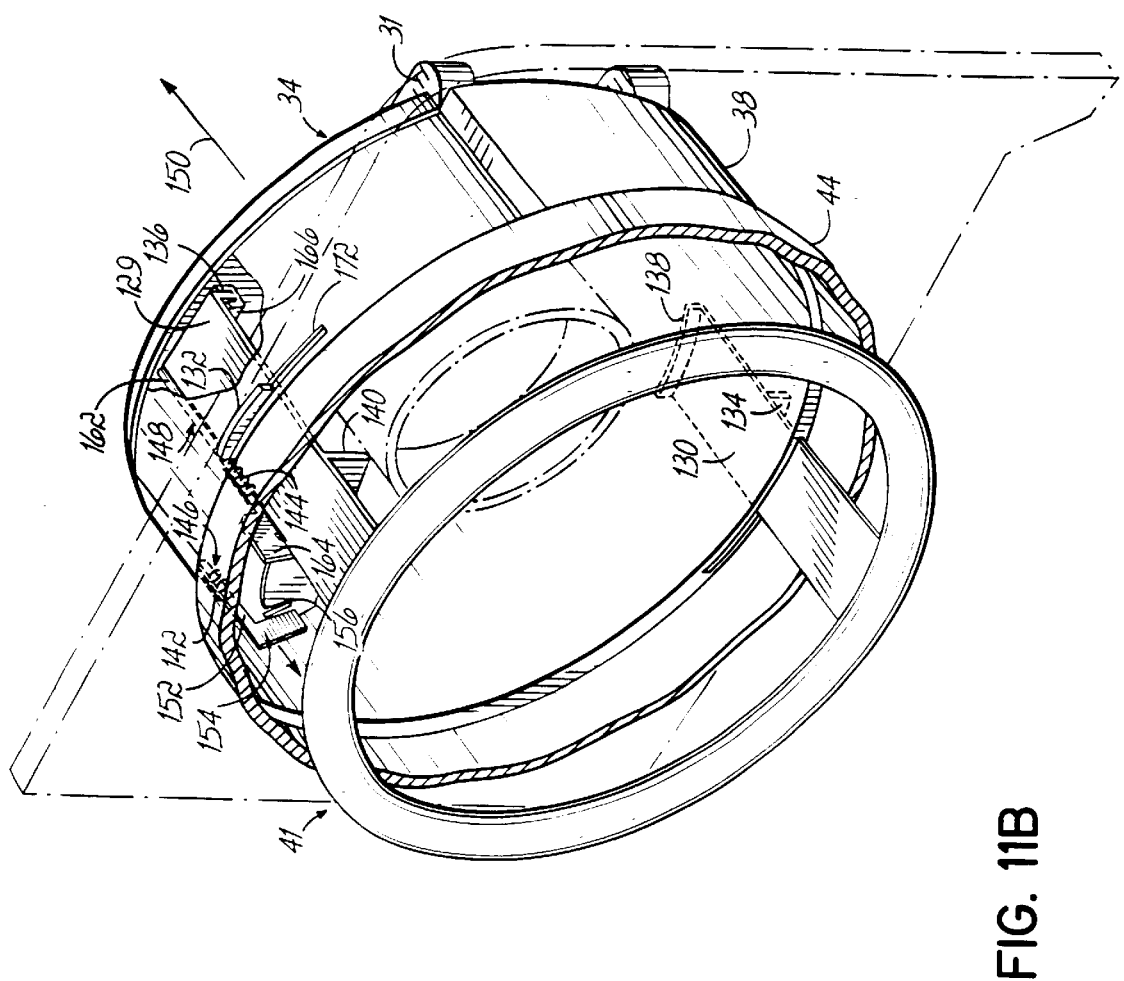
Figure 11C:
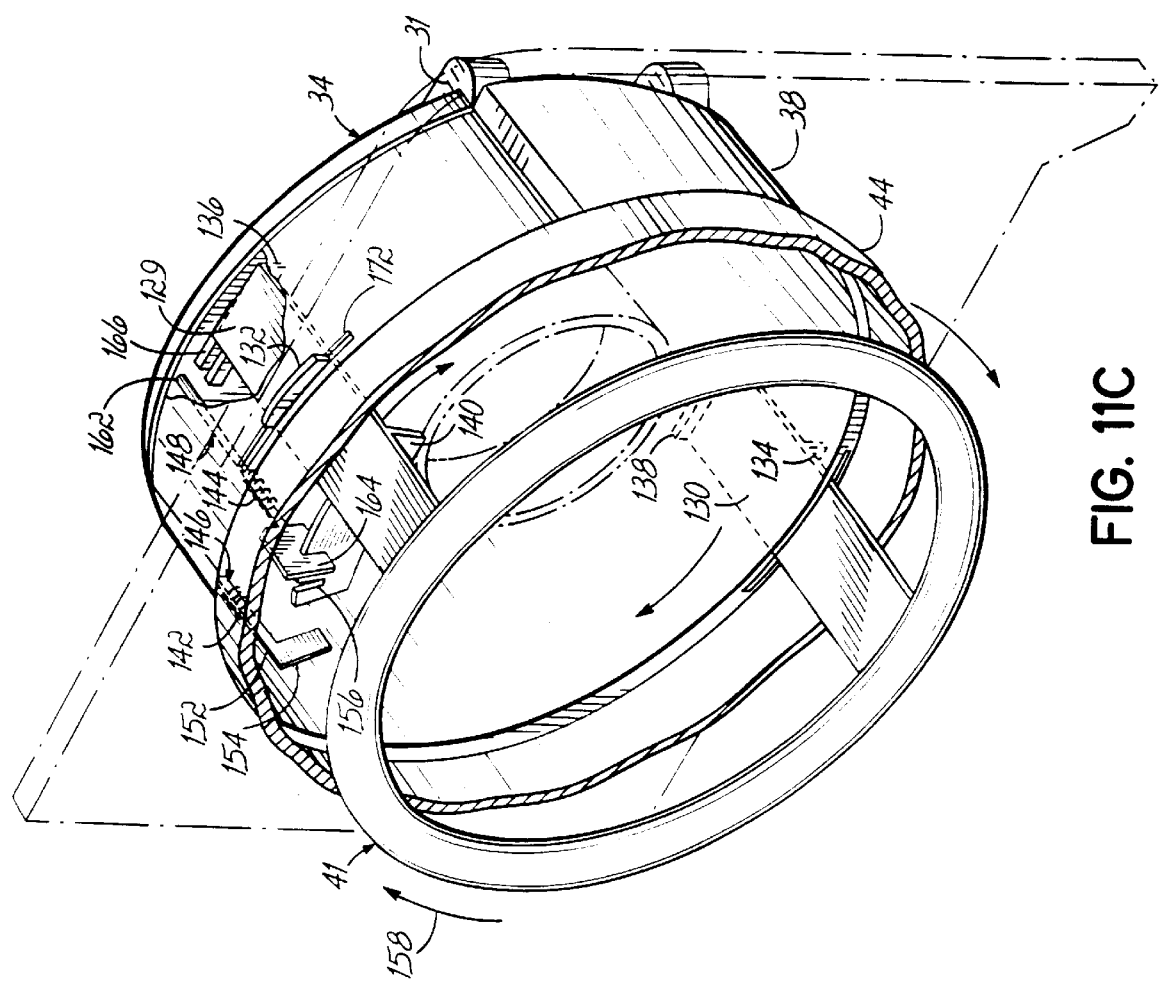
Figure 11D:
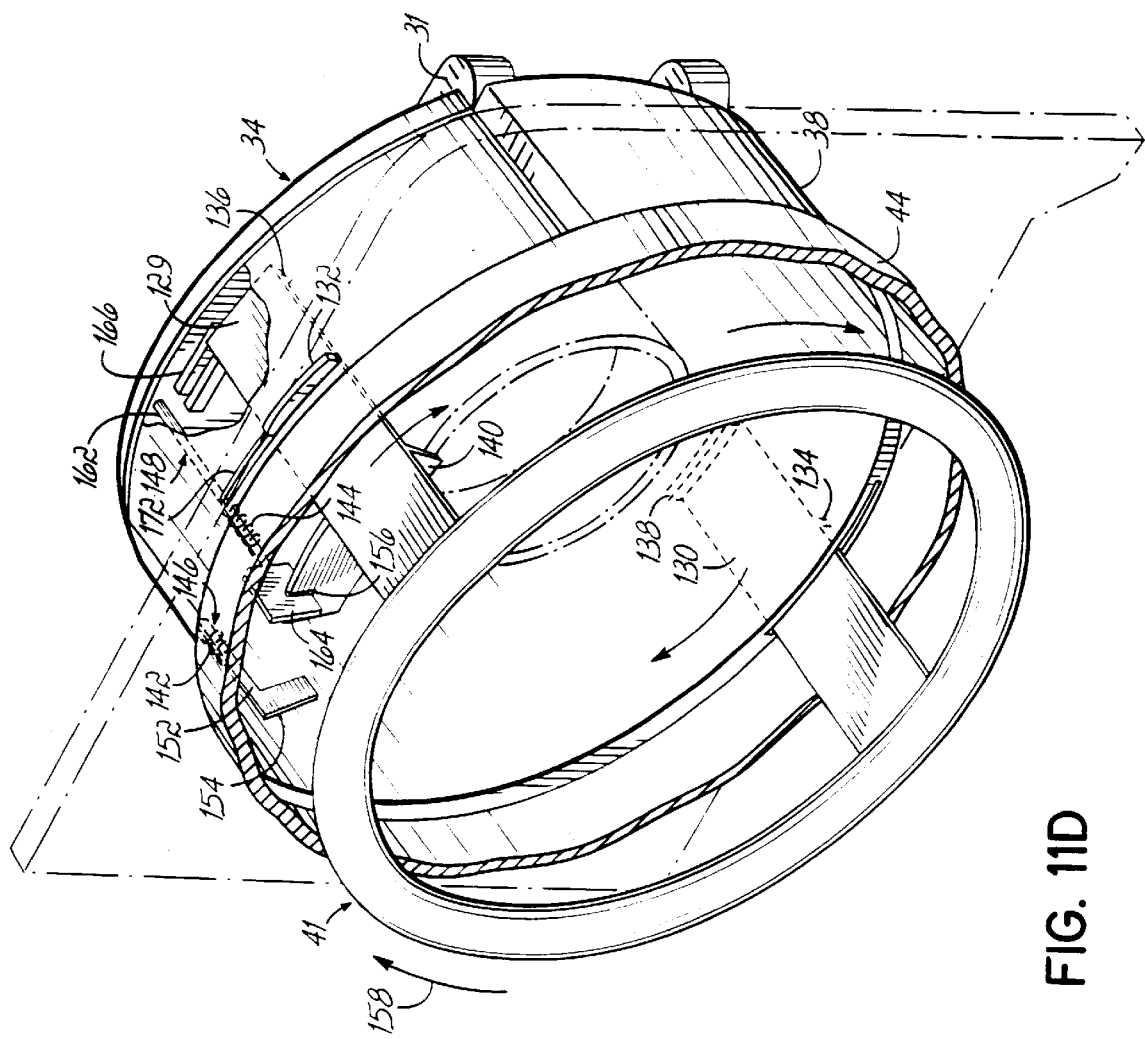
Figure 11E:
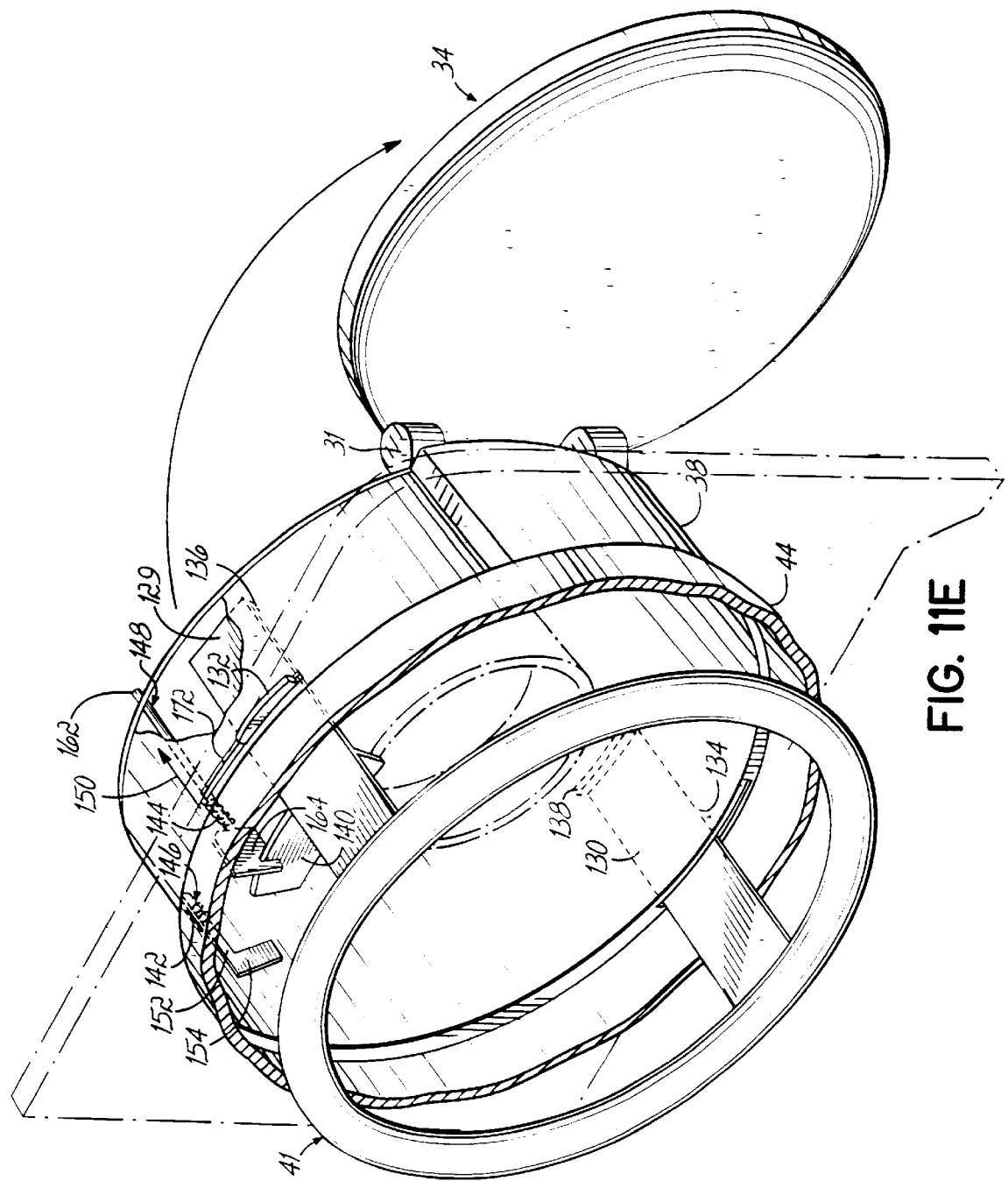

The first handle receiving member 116 further supports first and second spring biased switches 142, 144. The first and second spring biased switches include first and second flag-shaped probe members 146, 148. (See FIGS. 11A–11C) These probe members are fixed within the spring biased switches and are both biased in the direction of arrow 150. The first probe 146 includes an extended portion 152 and a lower enlarged portion 154. When the first spring biased switch is extended, in other words in a non-compressed state, it is positioned in slot 156 in arcuate member 140. This prevents the handle 41 from rotating. When this switch 142 is compressed, the enlarged portion 154 of the probe 146 will move below the arcuate plate member 140 and allow the handle 41 to rotate in the direction of arrow 158.

The probe 148 of the second spring biased switch 144 has an extended portion 162 and an enlarged portion 164. The enlarged portion 164 has a slot 166. Slot 166 will allow enlarged portion 164 to ride on the arcuate plate member 140 when the switch is in a compressed state. When enlarged portion 164 is aligned with the slot 156 in the arcuate plate 140, i.e., when the probe 148 moves in the direction of arrow 150, the enlarged portion moves into slot 156 stopping further rotation of the handle 46.

When assembled, the prongs 129, 130 extend upwardly through the outer housing into the inner housing with the tabs 132 and 134 extending through slots 172, 174 in the outer wall of the inner housing. Tabs 136 and 138 in turn extend through slots 176, 178 in the inner wall of the inner housing near its upper edge 180. These prongs latch and unlatch the cover 34 and prevent the unit from being removed when the cover 34 is open as is explained below.

The first handle cover 48 includes three electrical connections which are adapted to receive three separate sets of wires. The first set of wires connect through fitting 54 and are low voltage wiring such as telephone connections, ethernet connections, television or radio antenna for cable. The second and third set attach via fitting 56, 58 and provide high voltage electric. The electrical wires would run through the bracket 48 around the handle 41 into the annular passage 114 in the lower housing through the inner passage of the upper housing to the central shroud.

The head connects to the HVAC unit utilizing a coaxial flexible duct 22. The outer wall 120 of the coaxial duct attaches to the exterior surface 122 of the large conduit 106 of the outer housing. The inner conduit 123 is attached to the lesser diameter conduit 107 which itself is attached to the inner housing. The ratio of the cross-sectional inner conduit to the outer conduit should be about 1 to about 3.

The head 18 includes the cover 34 which is attached by hinge 120 to the upper housing 38. The head 18 is attached to the window of a vehicle using a template or adapter 126 as shown in FIG. 1. The use of an adaptor allows one head design to attach to any vehicle window. This adaptor 126 has an opening 128 which mates with the head 18 and an exterior configuration which mates with the window opening providing a tight seal. Spring biased latches 125 hold the head in place.

The opening 128 through the adapter 126 includes upper and lower cut out portions 132, 134 adapted to permit tabs 132 and 134 to pass through the adaptor. When this occurs, the first spring biased switch 142 is compressed by the adapter, forcing the first probe 146 below the arcuate plate 140 permitting the handle to rotate. Rotation of the handle will cause the tabs 132, 134 to rotate out of alignment with cut out portions 133, 135 where they engage the adaptor holding it in position. The upper tabs rotate in slots 176 and 178 within the inner wall of the inner housing moving out of engagement with latch members 166 and 168 in the cover permitting the cover to open.

Rotating handle 41 will align the slot in arcuate member 140 with the enlarged portion of probe 148. As the cover opens, the probe 148 of the second spring biased switch moves in the direction of arrow 150. At this point, the enlarged portion of the second probe 148 rests in the slot 156 in the arcuate plate 140 member preventing further rotation. This prevents the head from being separated from the adaptor if the cover is opened. This protects the head from the environment.

Likewise to remove the head from the template, the cover must first be closed which will compress spring switch 144 allowing the handle to rotate which will hold the cover in a closed position as the head is removed from the template.

The cover includes a variety of different features including a USB-port 182, a connector 184 for the truck computer, a credit card reader 186, a touch pad display screen 188 and a plurality of different dedicated buttons or switches used to control the unit and to activate various features of the unit.

The controls on the cover activate and control the functioning of the unit. Head 18 has a central processing unit (not shown) which can be programmed to function as desired and to provide all desired Internet communication and functions. Although the particular configuration of the head can vary dramatically depending upon the desired functions, the device as shown has a variety of beneficial features.

For example, it includes a touch switch 190 which turns the screen light on and off so that the head can remain open during the night without illuminating the cab. It further includes an adjacent LED 191 which will help the occupant locate the light on/off switch in the dark. There is also a dedicated help button 194 which can initiate step by step procedures for the functioning of the head. There is also a menu button which basically takes one to the top level of the menu. A dedicated thermostat button 196 activates the screen to show the temperature and provide for increasing or decreasing the temperature within the cab as well as activating or deactivating the fan. Also switches 198 to active the web browser, messaging systems, catalog-type shopping, and the like can be included. Finally a checkout button can also be provided. Spring switch 144 can also act as a check out switch. Thus when the head is removed from the template, the unit is deactivated and the customer is billed.

Further, the connection 184 for the truck's onboard computer permits communication between the truck's computer and a central diagnostic unit via the Internet or through telephone lines.

The window adapter can be positioned into the window of the truck by simply lowering the window, placing the adapter in position and raising the window until it is held tight by the upper pressure of the window against the template. This is preferably done before the ventilation head is attached to the adapter. The ventilation head would then be placed in the opening in the adapter. Since the adapter rests against the gasket, a relatively air tight seal is formed.

The present invention includes many different optional features which improve the overall function of the present invention. As shown in FIG. 1, the device includes a breakaway system at the HVAC support. Thus, if a truck driver inadvertently drives away with the unit attached, the lines will break away at the upper area and thus no live electrical wires will be at ground level.

The electrical lines connect to a central switching unit. The electricity to the head particularly the 110V is only activated or provided once the unit is installed and activated (generally using a credit card). This would obviously prevent theft of electricity as well as providing an added safety feature. The unit also shows a 220 v. outlet 208 designed to run the reefer unit of a trailer. This also would be activated via the head unit.

Further, when the unit itself is disconnected and the head closed, air can be recirculated through the inner tube and return through the outer tube recirculating air within the hose to maintain flexibility in extremely cold temperatures. It would also potentially prevent introducing very cold air into the cab of a truck initially. This can be activated either locally or through a central server.

As shown in FIGS. 9 and 10, instead of attaching the present unit to the window of a truck or vehicle, it can be attached to a wall of a vehicle using a semi-permanent adapter. This adapter 200 is a rectangular unit which is generally bolted or generally fixed to the side wall of the cab of the truck or cab of the vehicle. It can also be formed at the factory. Adapter 200 includes a door 202 covering a round opening 204 which corresponds in size to the exterior shape of the head 18. Thus, it acts just like an adapter 30. Instead of inserting the head 18 into the adapter which is in the window, one simply opens the door 202 and inserts the head 18 into this opening 204 and the unit is operated in the same manner as previously described.

The present invention has been described with respect to a separate head unit which is permanently attached to an HVAC unit. It is also within the scope of the present invention to permanently mount the head within the truck such as through a side wall and simply connect the head to the HVAC unit at the truck stop. Thus, the air handling hoses and electrical connections would simply plug into a permanently attached unit on the truck. Once the connections were made, the truck driver could then activate the HVAC unit and other options such as Internet connection, electricity to the reefer unit in the same manner as described with the preferred embodiment of the present invention. Further, with respect to all communication systems, the present invention has been described wherein the communication lines are hard wired into the head. Obviously this can be conducted using wireless communications if desired.

This has been a description of the present invention along with the preferred method of practicing the invention. However, the invention itself should only be defined by the appended claims wherein

We claim:

1. A ventilation head adapted to attach to a vehicle comprising:
   a body portion;
   a cover hinged to said body portion and adapted to enclose said body portion;
   said body portion attached to an air circulation unit; and
   said cover supporting controls for said ventilation head.

2. The ventilation head claimed in claim 1 wherein said body portion includes high voltage connections.

3. The ventilation head claimed in claim 1 wherein said body portion includes at least one communication/cable hook-up.

4. The ventilation head claimed in claim 1 wherein said cover includes a credit card reader.

5. The ventilation head claimed in claim 1 wherein said cover includes a key pad.

6. The ventilation head claimed in claim 1 wherein said cover has a display screen.

7. The ventilation head claimed in claim 6 wherein said display screen is an interactive touch screen display.

8. The ventilation head claimed in claim 1 wherein said body includes an air inlet and an air outlet wherein said air outlet circumscribes said air inlet and said head is adapted to recirculate air in a truck cab.

9. The ventilation head claimed in claim 8 wherein the volumetric ratio of said air inlet to said air outlet is 1 to at least about 2.5.

10. The ventilation head claimed in claim 8 wherein said air inlet is a cylindrical member supported in said body portion by two parallel lateral braces and wherein said cover holds said low voltage components in a central portion which is adapted to fit between said two braces when said cover is closed upon said body portion.

11. The ventilation head claimed in claim 1 wherein said controls are attached to said body portion by a ribbon connection which runs along a hinge.

12. The ventilation head claimed in claim 1 wherein said body portion is connected to an air circulation unit by a flexible coaxial air conduit.

13. The ventilation head claimed in claim 1 wherein said body portion includes an external AC outlet.

14. The ventilation head claimed in claim 1 wherein said ventilation head has a generally circular housing and said housing includes a keyed portion.

15. The ventilation head claimed in claim 1 wherein said cover closes upon said body portion to form a weather-tight seal.

16. The ventilation head claimed in claim 1 wherein said body portion is connected to two electrical components and to said air ventilation unit by a breakaway connection.

17. The ventilation head claimed in claim 1 wherein said ventilation head includes a window template adapted to fit within the window opening of a motor vehicle and wherein said template includes a first and second latch adapted to engage said body portion.

18. The ventilation head claimed in claim 1 in combination with an exterior electrical outlet separate from said head wherein said head acts to activate said exterior electrical outlet.

19. A unit for providing services to a stationary vehicle through an opening in said vehicle comprising:
   a head unit having a generally mating configuration with said opening;
   said head unit having a body portion and a cover said cover adapted to open into said vehicle to provide access to said services;

a closure mechanism adapted to release said cover permitting opening of said cover only when said head is located in said opening and further adapted to prevent said head from separating from said opening if said cover is not closed on said head.

20. The unit claimed in claim 22 said closure mechanism included a latch mechanism adapted to engage an edge of said opening;

a first stop mechanism adapted to prevent said latch mechanism from moving if said head is not located in said opening.

21. The unit claimed in claim 20 further including a second stop mechanism adapted to prevent said latch mechanism from releasing from said opening if said cover is not closed.

22. The unit claimed in claim 20 wherein said first stop mechanism is a first spring biased switch having a stop member adapted to engage said latch mechanism and prevent movement of said latch mechanism if said first spring biased switch is not depressed.

23. The unit claimed in claim 22 wherein said second stop mechanism is a second spring biased switch adapted to prevent movement of said latch mechanism if said spring switch is not depressed by said cover.

24. The unit claimed in claim 23 wherein one of said spring switches is adapted to terminate said services.

25. The unit claimed in claim 23 wherein one of said spring biased switches provides a signal initiating charging for said services.

26. The unit claimed in claim 19 wherein said opening extends through an adapter unit positioned in an opened window of said vehicle.

27. The unit claimed in claim 19 wherein said opening extends through a wall in said vehicle.

\* \* \* \* \*

UNITED STATES PATENT AND TRADEMARK OFFICE
CERTIFICATE OF CORRECTION

PATENT NO. : 6,705,938 B2
DATED : March 16, 2004
INVENTOR(S) : David Everhart and Lloyd G.B. Cooper It is certified that error appears in the above-identified patent and that said Letters Patent is hereby corrected as shown below:

Column 2,
Line 1, "is a disassemble perspective view of" should be -- is a disassembled perspective view of --.
Lines 45-46, "voltage connectors 56, 58 connectors." should be -- voltage connectors 56, 58. --.

Column 5,
Line 24, "The unit also shows a 220 v. outlet 208..." should be -- The unit also shows a 220V outlet 208... --.

Column 6,
Lines 65-66, "having a body portion and a cover said cover adapted to open into said vehicle" should be -- having a body portion and a cover, said cover adapted to open into said vehicle --.

Column 7,
Lines 6-7, "The unit claimed in claim 22 said closure mechanism included a latch mechanism adapted to..." should be -- The unit claimed in claim 19, said closure mechanism including a latch mechanism adapted to... --.

Signed and Sealed this

Fourth Day of April, 2006

JON W. DUDAS
*Director of the United States Patent and Trademark Office*